United States Patent Office 3,175,286
Patented Mar. 30, 1965

3,175,286
METHOD OF TREATING METAL POWDERS FOR BRAZING PURPOSES
Arthur T. Cape, Monterey, Calif., assignor to Coast Metals, Inc., Little Ferry, N.J., a corporation of Delaware
No Drawing. Filed Oct. 4, 1963, Ser. No. 313,752
8 Claims. (Cl. 29—496)

This application is a continuation-in-part of my copending application, Serial No. 62,337, filed October 13, 1960, and now abandoned.

This invention relates generally to the treatment of metal powders for the purpose of improving the flow properties of such powders when used for brazing purposes.

In the brazing of alloys used for high temperature service, such, for example, as stainless steels and the so-called "Superalloys" or "Super Strength" alloys, which include chromium-nickel-iron alloys, chromium-nickel-cobalt alloys (with or without iron), nickel-base alloys, cobalt-base alloys and other alloys which fall within this general category, it is difficult, in many cases, to obtain good flow of the brazing alloys, and this is particularly true when such stainless steels, Superalloys or Super Strength alloys contain aluminum and/or titanium as an ingredient or ingredients.

The chemical compositions of such Superalloys, as well as their rupture strengths at various temperatures, are contained in a compilation by ASTM Subcommittee XII, published by the Metal Processing Division of Curtiss-Wright Corporation, Buffalo 15, N.Y., but this compilation is by no means exhaustive, and it is to be understood that other alloys, such as Rene 41, etc., fall within this general category. In general, Superalloys are defined as alloys developed for high temperature service where relatively high stresses (tensile, thermal, vibratory and shock) are encountered and where oxidation resistance is frequently required (see definition on page 37 of Metals Handbook, vol. 1, 8th Edition, published in 1961 by American Society for Metals).

Although the treatment which is about to be described is applicable generally to all brazing alloys for the purpose of improving the flow properties of the alloys, I have found it to be particularly effective for the treatment of (a) nickel-base brazing alloys, including nickel-silicon-boron alloys and nickel-chromium-silicon alloys, (b) cobalt-base alloys, including cobalt-tungsten-nickel-silicon-boron alloys, (c) manganese-base alloys, including manganese-nickel alloys, manganese-cobalt alloys, and manganese-nickel-cobalt alloys, and (d) iron-base alloys.

I have found, as the result of extensive experimentation and actual use in industry, that the flow properties of the brazing alloys, in such cases, are enhanced or improved, to a great extent, by a treatment of the brazing alloys, in granular or powder form, prior to use of the alloys for brazing.

The treatment, which, for purposes of general description, may be termed as an acid washing of the powdered brazing alloys, may assume several different forms or procedures, one of which is suitable for laboratory or research and development purposes, and the other of which is adapted for large or production quantities of the powders.

In the laboratory or research and development procedure, a relatively small predetermined amount of the brazing alloy powder is placed in a suitable receptacle, and an aqueous solution containing a predetermined amount of hydrofluoric acid and a predetermined amount of a fluoride or fluoborate is charged into the receptacle. The powder and solution are then stirred together for a few minutes, and the mixture permitted to soak for a longer period of time, so that the solution is intimately mixed with the powder, and the excess solution permitted to separate from the powder. The excess solution is then decanted, and the powder thus treated is then dried in a baking oven at approximately 180° F. The dried powder is crushed and screened through a 100-mesh screen, preparatory to using it for brazing purposes.

In the other procedure, which is adapted for large or production quantities of brazing powder, a predetermined large quantity of brazing powder is charged into a tumbling barrel or drum, and while the barrel or drum is rotated, a measured amount of water is charged into the drum, followed by a measured amount of hydrofluoric acid. The rotation of the barrel or drum is continued for a predetermined period of time to insure that the contents of the barrel or drum are thoroughly mixed, and the contents are then permitted to settle for a few minutes, after which the supernatant liquid is drained off. A predetermined quantity of a fluoride or fluoborate is then added to the contents of the drum, and the tumbling continued while heating the drum externally until steam ceases to issue from the interior of the drum, thereby insuring that the powder is dry. The contents of the drum are then discharged and sieved before being packed for sale or use.

The brazing powders thus treated or washed have greatly improved brazing qualities or properties over the same powders which have not been treated. These improvements include marked lowering of the flow point of the powder during furnace brazing, greatly improved flow properties, excellent bonding and diffusion at the interfaces between the parts being brazed, and no apparent eroding of the parts.

The amounts of hydrofluoric acid, as well as the amounts of fluoride or fluoborate used in the treatment will vary, depending upon the particular composition of the powder which is being treated, as well as the mesh size of the powder.

In general, however, the solution used to treat the powder, in accordance with either of the procedures which have been described, is an aqueous solution containing from about 1% to about 8% by weight of hydrofluoric acid, and containing a fluoride or fluoborate, in amounts of from about 1% to about 8% by weight of the solution. The amount of fluoride or fluoborate used may be an amount up to the maximum solubility of the fluoride or fluoborate in the solution, these maximum solubilities being found in any standard chemical handbook. However, for all practical purposes, the amount by weight of the solution of fluoride or fluoborate should be within the range of from about 1% to about 8%.

In the second of the above-described procedures, although the water, hydrofluoric acid, and fluoride or fluoborate, are charged into the drum separately, or at different times during the treatment, the net result is substantially the same as in the first procedure, that is to say, the powder is washed by an aqueous solution containing about 1% to about 8% by weight of hydrofluoric acid, and from about 1% to about 8% by weight of the fluoride or fluoborate.

Fluorides which may be used in the process are sodium fluoride, potassium fluoride, caesium fluoride, lithium fluoride, and rubidium fluoride.

Fluoborates which may be used in the process are sodium fluoborate and potassium fluoborate.

The proportion of powder treated to the solution by which it is treated may vary within wide limits, but, in general, the proportion, by weight, of the material treated to the solution, may vary from about 1:2 to about 10 to 1.

Other factors may be varied, such as the time of treatment, but, in general, the time of treatment may vary from about 2 minutes to about two hours.

The dried powder, after the treatment, may be mixed with an acrylic resin or any other suitable binder, and is then used for brazing purposes, although it may also be used without a binder.

As a result of the treatment, the solution finds its way into the interstices between the powder particles and actually clings to such particles or is absorbed, to some extent, by the particles.

The improvement in the flow properties of the brazing alloys thus treated is difficult to explain, but is probably due to the fact that the fluoride or fluoborate is absorbed by the powder metal particles, instead of being adhered thereto superficially. In any event, the fluoride or fluoborates is so absorbed by the paritcles, that when the powder is used in a brazing operation, the fluoride or fluoborate is not found in the brazed joint in any amount. Moreover, the improvement in flow properties is very substantial, as evidenced by the appearance and character of the brazed joint.

The hydrofluoric acid in the solution is more than a mere solvent for the fluoride or fluoborate, since the solvent is actually the water. The hydrofluoric acid is present in the solution primarily to provide additional fluorine ions, which are effective, in combination with the fluorine ions from the various compounds to facilitate and energize the washing treatment or procedure, and aid in the absorption of the fluoride or fluoborate in the metal particles.

Examples of the first of the above-described procedures are as follows:

*Example 1*

50 grams of a Coast Metals #50 Series alloys, which is a nickel-base brazing alloy containing silicon and boron, were placed in a receptacle, and 100 cc. of an aqueous solution containing 1.0% by weight of hydrofluoric acid and 3.0% by weight of potassium fluoborate were placed in the receptacle. The contents of the receptacle were stirred for approximately 3 to 5 minutes, and permitted to soak for about one-half hour. The excess solution was then decanted, and the treated material then dried in a baking oven at approximately 180° F., while being stirred periodically. The dried material was then crushed and screened through a 100-mesh screen.

*Example 2*

50 grams of Coast Metals No. 62, which is a manganese-cobalt-base alloy containing about 6% tungsten, about 16% nickel, and about 16% cobalt, was treated in exactly the same manner as in Example No. 1.

*Example 3*

50 grams of Coast Metals No. 8659E, which is a cobalt-base alloy containing about 6% tungsten, about 2% nickel, about 1.25% boron, and about 2.5% silicon, were placed in a receptacle, and 100 cc. of an aqueous solution containing 6.0% hydrofluoric acid and 6.0% potassium fluoborate were placed in the receptacle. The treatment was then the same as in Example 1. The material treated, in this instance, was $-8+14$ mesh size. In the case of the same material, but of $-150$ mesh size, the aqueous solution is modified, so that it contains only 1.0% hydrofluoric acid and 3.0% potassium fluoborate.

The alloy after treatment with the solution containing 6.0% hydrofluoric acid and 6.0% potassium fluoborate, had good flowing characteristics at 2200° F., which is 50 Fahrenheit degrees lower than that at which the same material, in untreated condition, flows.

*Example 4*

50 grams of Coast Metals No. 1267–M, which is an iron-base alloy, were placed in a receptacle, and 100 cc. of an aqueous solution containing 1.0% hydrofluoric acid and 3.0% potassium fluoborate were placed in the receptacle. The treatment was then the same as in Example 1.

An example of the second of the above-described procedures is as follows:

*Example 5*

50 lbs. of Coast Metals No. 52 powder ($-150+270$ mesh size), which is an alloy consisting of about 91% nickel, about 4.5% silicon, and about 3% boron, were placed in a drum. The contents of a can containing 64 oz. (2525 ml.) of water were discharged into the drum, after which 2.54 oz. (75 ml.) of concentrated hydrofluoric acid were discharged from a plastic cap into the drum. A rubber stopper was placed in the charging hole in the drum, and the drum rotated for 1½ hours, after which the drum was stopped and the contents of the drum permitted to settle for five (5) minutes. The supernatant liquid was then drained from the drum. The inflammable parts (stopper, plastic, etc.) were then removed, and 72 gm. of potassium fluoborate introduced into the drum. The drum was then rotated, and heated externally until steam ceased to exit from the drum. The contents of the drum were then dumped into a receiver, sieved, and packaged.

It will be understood that variations in the brazing alloy treated, as well as in the method of treatment, may be made without departing from the spirit of the invention, or the scope of the appended claims.

Having thus described my invention, I claim:

1. The method of enhancing the flow properties of brazing alloys, which comprises subjecting the brazing alloy, in powder form, to treatment with an aqueous solution containing only hydrofluoric acid in an amount of from about 1% to about 8% by weight, and about 1% to about 8% by weight of a compound selected from the group consisting of sodium fluoride, potassium fluoride, caesium fluoride, lithium fluoride, rubidium fluoride, sodium fluoborate and potassium fluoborate, causing the solution to be thoroughly mixed with the powder, whereby the compound is absorbed by the powder particles, and drying the powder.

2. The method, as recited in claim 1, in which the brazing alloy is an alloy selected from the group consisting of nickel-base brazing alloys, cobalt-base brazing alloys, manganese-base brazing alloys, and iron-base brazing alloys.

3. The method, as recited in claim 2, in which the proportion of the material treated to the treating solution varies from about 1:2 to about 10:1, by weight.

4. The method as recited in claim 3, in which the time of treatment varies from about two minutes to about two hours.

5. The method of brazing an alloy for high temperature service, said alloy selected from the group consisting of stainless steels and superalloys, said method comprising brazing said alloy by means of a brazing alloy which has been treated, in powder form, with an aqueous solution containing only hydrofluoric acid in an amount of from about 1% to about 8% by weight of the brazing alloy, and from about 1% to about 8% by weight of the brazing alloy of a compound selected from the group consisting of sodium fluoride, potassium fluoride, caesium fluoride, lithium fluoride, rubidium fluoride, sodium fluoborate and potassium fluoborate.

6. The method, as recited in claim 5, in which the brazing alloy is an alloy selected from the group consisting of nickel-base brazing alloys, cobalt-base brazing alloys, manganese-base alloys, and iron-base brazing alloys.

7. The method, as recited in claim 6, in which the proportion of the brazing alloy to the treating solution varies from about 1:2 to about 10:1, by weight.

8. The method, as recited in claim 7, in which the time of treatment varies from about two minutes to about two hours.

References Cited by the Examiner
UNITED STATES PATENTS

| | | | |
|---|---|---|---|
| 2,133,294 | 10/38 | Gordon | 29—496 |
| 2,807,561 | 9/57 | Nelson | 29—496 X |
| 3,021,595 | 2/62 | Milam | 29—495 X |
| 3,069,765 | 12/62 | Simpelaar | 29—494 X |
| 3,079,251 | 2/63 | Donnelly et al. | 29—495 X |
| 3,128,546 | 4/64 | Schuster et al. | 29—496 X |

JOHN F. CAMPBELL, *Primary Examiner.*